(No Model.)
J. CALDON.
METHOD OF HEATING FEED COOKERS.
No. 600,512. Patented Mar. 15, 1898.
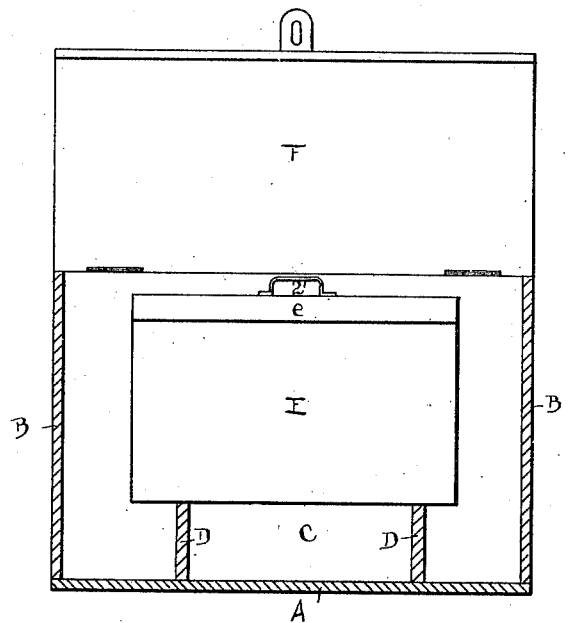
WITNESSES:
C. A. Hiss.
A. M. Elkjer.
INVENTOR
John Caldon
BY G. M. Sues
ATTORNEY.

UNITED STATES PATENT OFFICE.

JOHN CALDON, OF BENKELMAN, NEBRASKA.

METHOD OF HEATING FEED-COOKERS.

SPECIFICATION forming part of Letters Patent No. 600,512, dated March 15, 1898.

Application filed July 19, 1897. Serial No. 645,199. (No model.)

*To all whom it may concern:*

Be it known that I, JOHN CALDON, residing at Benkelman, in the county of Dundy and State of Nebraska, have invented certain useful Improvements in Methods of Heating Feed-Cookers; and I do hereby declare that the following is a full, clear, and exact description of the invention, such as will enable others skilled in the art to which it appertains to make and use the same, reference being had to the accompanying drawing, which forms a part of this specification.

This invention has relation to a novel method of heating feed-cookers.

The object of my invention is to provide a method that shall be simple enough so that any operator of ordinary intelligence can use the same, and the apparatus used in conjunction therewith is of the simplest construction.

By means of my method of heating feed-cookers the material may be thoroughly cooked without scorching or burning, and the device used in conjunction therewith is noticeable because of its extreme simplicity.

In the accompanying drawing I have shown a sectional view of an ordinary casing, showing the feed-receptacle placed therein, the lid of the casing being shown as raised.

In a great many sections of the country, especially in the prairie regions, where wood and coal are quite expensive and scarce, it is a matter of no little expense for the farmers to cook the feed for the stock, especially in winter, and as the feeding of cooked food has been found to give the most beneficial results it is desirable to prepare this food in the most inexpensive manner, and the aim of my invention is to provide a method that shall be both simple and comparatively inexpensive.

In my improved method I use an ordinary housing, which may comprise a casing having the bottom A and sides B and the supporting-sills D D therein and provided with an ordinary lid F. Within this housing is placed an ordinary cooker E, having a top *e* and an operating-handle 2. In the drawing this receptacle is shown as square, though one of any other suitable conformation could be used. It is desirable, however, to have a specially tight and snug fitting lid to cover the cooking-receptacle.

In the use of a cooker adapted to hold approximately five bushels of feed I would first provide the main casing or housing upon the bottom with about ten inches of fresh stable-manure. This would then be liberally sprinkled with lime. I would then place within the housing the cooker E and add another layer of manure, which would again be sprinkled with lime, this operation being continued until the main housing was filled. The top would then be sprinkled with blue-stone, the whole being moistened with a solution of sulfuric acid.

In cooking a batch of five bushels of feed, for instance, I would use with a suitable amount of stable-manure one bushel of unslaked lime, one pound of blue-stone, and one pint of sulfuric acid diluted in four gallons of water. The lid F is then closed, when the products decompose, and in this operation sufficient heat is generated to thoroughly cook the five bushels of feed in about twenty-four hours.

The device is noticeable because of its extreme simplicity; and now,

Having thus described my said invention, what I claim as new, and desire to secure by United States Letters Patent, is—

The method of cooking, which consists in surrounding a suitable cooker, first, with alternate layers of fresh stable-manure and unslaked lime, and then sprinkling the whole with blue-stone and a solution of sulfuric acid, approximately in the proportions set forth.

In testimony whereof I affix my signature in presence of two witnesses.

JOHN $\overset{\text{his}}{\times}$ CALDON.
<div style="text-align:center">mark</div>

Witnesses:
WM. J. NAGLE,
GEO. W. SUES.